(12) United States Patent
Kim et al.

(10) Patent No.: US 8,182,939 B2
(45) Date of Patent: *May 22, 2012

(54) ANODE MATERIAL FOR LITHIUM SECONDARY CELL WITH HIGH CAPACITY

(75) Inventors: You Min Kim, Daegu (KR); Ki Young Lee, Daejeon (KR); Seo Jae Lee, Daejeon (KR); Suk Myung Roh, Goyang-si (KR); Ou Jung Kwon, Seoul (KR)

(73) Assignee: LG Chem, Ltd. (KR)

( * ) Notice: Subject to any disclaimer, the term of this patent is extended or adjusted under 35 U.S.C. 154(b) by 1195 days.

This patent is subject to a terminal disclaimer.

(21) Appl. No.: 10/558,467

(22) PCT Filed: Jun. 25, 2004

(86) PCT No.: PCT/KR2004/001541
§ 371 (c)(1),
(2), (4) Date: Nov. 28, 2005

(87) PCT Pub. No.: WO2004/114439
PCT Pub. Date: Dec. 29, 2004

(65) Prior Publication Data
US 2006/0234127 A1 Oct. 19, 2006

(30) Foreign Application Priority Data
Jun. 25, 2003 (KR) .................. 10-2003-0041498

(51) Int. Cl.
H01M 4/02 (2006.01)
H01M 4/62 (2006.01)

(52) U.S. Cl. ................. 429/209; 429/232

(58) Field of Classification Search .............. None
See application file for complete search history.

(56) References Cited

U.S. PATENT DOCUMENTS

| | | | |
|---|---|---|---|
| 5,702,845 A | 12/1997 | Kawakami et al. | |
| 5,908,715 A | 6/1999 | Liu et al. | ............. 429/217 |
| 6,395,423 B1 | 5/2002 | Kawakami et al. | |
| 6,541,156 B1 * | 4/2003 | Fuse et al. | ............. 429/218.1 |
| 6,558,438 B1 | 5/2003 | Satoh et al. | |

(Continued)

FOREIGN PATENT DOCUMENTS

EP  1 100 134  5/2001

(Continued)

OTHER PUBLICATIONS

KIPO machine translation, KR 10-2005-0001404 (Jan. 2005), Kim et al.*

(Continued)

*Primary Examiner* — Barbara Gilliam
*Assistant Examiner* — Adam A Arciero
(74) *Attorney, Agent, or Firm* — Cantor Colburn LLP

(57) ABSTRACT

Disclosed is an anode material comprising a metal core layer capable of repetitive lithium intercalation/deintercalation; an amorphous carbon layer coated on the surface of the metal core layer, and a crystalline carbon layer coated on the amorphous carbon layer. The anode material not only maintains a high charge/discharge capacity, which is an advantage of a metal-based anode material, but also inhibits changes in the volume of a metal core layer caused by repetitive lithium intercalation/deintercalation in virtue of an amorphous carbon layer and a crystalline carbon layer, thereby improving the cycle life characteristics of cells.

11 Claims, 4 Drawing Sheets

U.S. PATENT DOCUMENTS

| | | | |
|---|---|---|---|
| 2002/0051903 A1 | 5/2002 | Masuko et al. | |
| 2002/0164479 A1* | 11/2002 | Matsubara et al. | 428/367 |
| 2006/0234127 A1 | 10/2006 | Kim et al. | |
| 2007/0099088 A1* | 5/2007 | Kwon et al. | 429/232 |
| 2007/0122707 A1* | 5/2007 | Kwon et al. | 429/231.95 |
| 2007/0122710 A1* | 5/2007 | Kwon et al. | 429/232 |

FOREIGN PATENT DOCUMENTS

| | | | |
|---|---|---|---|
| EP | 1 120 339 | | 5/2001 |
| EP | 1102339 A2 | | 5/2001 |
| JP | 10-003920 A | | 1/1998 |
| JP | 10-223221 | | 8/1998 |
| JP | 2000203818 | | 7/2000 |
| JP | 2000-215887 A | | 8/2000 |
| JP | 2000-285919 | | 10/2000 |
| JP | 2001-143698 | | 5/2001 |
| JP | 2001143698 | | 5/2001 |
| JP | 2001-297757 | | 10/2001 |
| JP | 2002-255529 | | 9/2002 |
| JP | 2003-123740 | | 4/2003 |
| KR | 1020030028241 A | | 4/2003 |
| KR | 10-2005-0001404 | * | 1/2005 |
| KR | 1020050001404 A | | 1/2005 |
| KR | 1020050055294 A | | 6/2005 |
| TW | 200501469 A | | 1/2005 |
| WO | 2004114439 A1 | | 12/2004 |

OTHER PUBLICATIONS

"Lithium Ion Secondary Battery"; p. 79 and 92; Nov. 2002.
Chinese Office Action dated Jul. 6, 2007 for Application No. 200480014417.8.
PCT International Search Report; International Application No. PCT/KR2004/001541; International Filing Date: Jun. 25, 2004; Date of Mailing : Sep. 20, 2004.
European Supplementary Search Report issued in the corresponding European Patent Application No. 04 774 011.3 on Jun. 22, 2009.
Japan Office Action; Dated May 19, 2009; Japanese Patent Applicaitno No. 2006-500701.
International Search Report for PCT/KR2006/004405 dated Jan. 30, 2007.
Korean Office Action for application No. 09-05-2007036403098 dated Jun. 29, 2007.
Chinese Office Action issued Aug. 14, 2009 for Publication No. 200680040262.4; with English Translation.
Wang, C. S. et al., "Lithium Insertion in Carbon-Silicon Composite Materials Produced by Mechanical Milling," J. Electrochem. Soc. 145, pp. 2751-2758 (1998).
U.S. Appl. No. 11/553,675, Office Action dated Jan. 29, 2010, 6 pages.
Chinese Office Action mailed Jun. 28, 2010 for Publication No. 200680040262.4; with English Translation.
Taiwanese Office Action mailed Jul. 9, 2010 for Publication No. 095139763; with English Translation.
Wang, C.S. et al., "Lithium Insertion in Carbon-Silicon Composite Materials Produced by Mechanical Milling," J. Electrochem. Soc. 145; 1998, pp. 2751-2758.
Yang, Z.G. et al., "Synthesis of Nanocrystalline SiC at Ambient Temperature Through High Energy Reaction Milling," NanoStructured Materials, vol. 7, Issue 8; 1996, pp. 873-886.

* cited by examiner

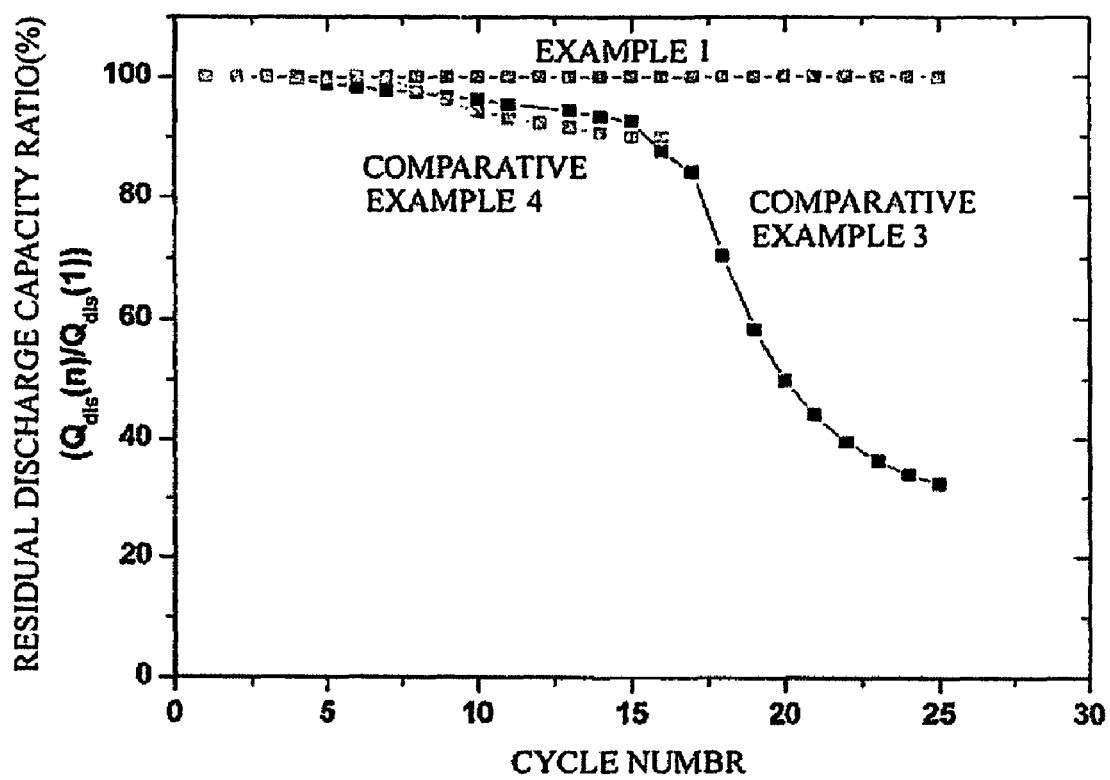

ANODE MATERIAL FOR LITHIUM SECONDARY CELL WITH HIGH CAPACITY

TECHNICAL FIELD

The present invention relates to an anode material for a lithium secondary cell and a lithium secondary cell using the same.

BACKGROUND ART

Currently, carbonaceous materials are used as anode materials for lithium secondary cells. However, it is necessary to use an anode material with a higher capacity in order to further improve the capacity of a lithium secondary cell.

For the purpose of satisfying such demands, metals capable of forming alloys electrochemically with lithium, for example Si, Al, etc., which have a higher charge/discharge capacity, may be considered for use as anode materials. However, such metal-based anode materials undergo extreme changes in volume, as lithium intercalation/deintercalation progresses, and thus the active materials are finely divided and the lithium cells have poor cycle life characteristics.

Japanese Patent Application Laid-Open No. 2001-297757 discloses an anode material essentially comprising an α-phase (e.g. Si) consisting of at least one element capable of lithium intercalation/deintercalation and a β-phase that is an intermetallic compound or solid solution of the element with another element (b).

However, the anode material according to the prior art cannot provide sufficient and acceptable cycle life characteristics, and thus it may not be used as a practical anode material for a lithium secondary cell.

BRIEF DESCRIPTION OF THE DRAWINGS

FIG. 7 is a graph showing the cycle life characteristics of the cells obtained from Example 1 and Comparative Examples 3 and 4.

DISCLOSURE OF THE INVENTION

Therefore, the present invention has been made in view of the above-mentioned problems, and it is an object of the present invention to provide an anode material for a lithium secondary cell having a high charge/discharge capacity and excellent cycle life characteristics.

It is another object of the present invention to provide an anode material for a lithium secondary cell, the anode material comprising a metal layer (core layer) capable of repetitive lithium intercalation/deintercalation, the surface of which is partially or totally coated with amorphous carbonaceous materials and crystalline carbonaceous materials, successively. By using the aforesaid anode material, it is possible to inhibit changes in the volume of a metal caused by the progress of lithium intercalation/deintercalation and to maintain a high electron conductivity among anode material particles, thereby providing a high charge/discharge capacity and excellent cycle life characteristics.

It is still another object of the present invention to provide a lithium secondary cell using the aforementioned anode material.

According to an aspect of the present invention, there is provided an anode material comprising: a metal core layer capable of repetitive lithium intercalation/deintercalation; an amorphous carbon layer coated on the surface of the metal core layer; and a crystalline carbon layer coated on the amorphous carbon layer. According to another aspect of the present invention, there is provided a lithium secondary cell using the above-described anode material.

According to the present invention, the metal core layer can provide a high charge/discharge capacity.

Additionally, the amorphous carbon layer and the crystalline carbon layer can inhibit changes in the volume of a metal caused by the progress of lithium intercalation/deintercalation, thereby improving the cycle life characteristics.

Even if a metal layer, for example a metal layer formed of Si, has electron conductivity and lithium ion conductivity to permit lithium intercalation/deintercalation, the electron conductivity, in this case, is too low to allow smooth progress of lithium intercalation/deintercalation. Therefore, the lithium intercalation/deintercalation property can be improved by forming a crystalline carbon layer so as to reduce contact resistance between an active material layer and a current collector, and contact resistance among active material particles.

The coating layers including the amorphous carbon layer and the crystalline carbon layer may partially or totally cover the surface of the metal core layer.

Meanwhile, the anode material preferably comprises the metal core layer, the amorphous carbon layer and the crystalline carbon layer, from core to surface, successively.

Hereinafter, the present invention will be explained in detail.

Figure 1:
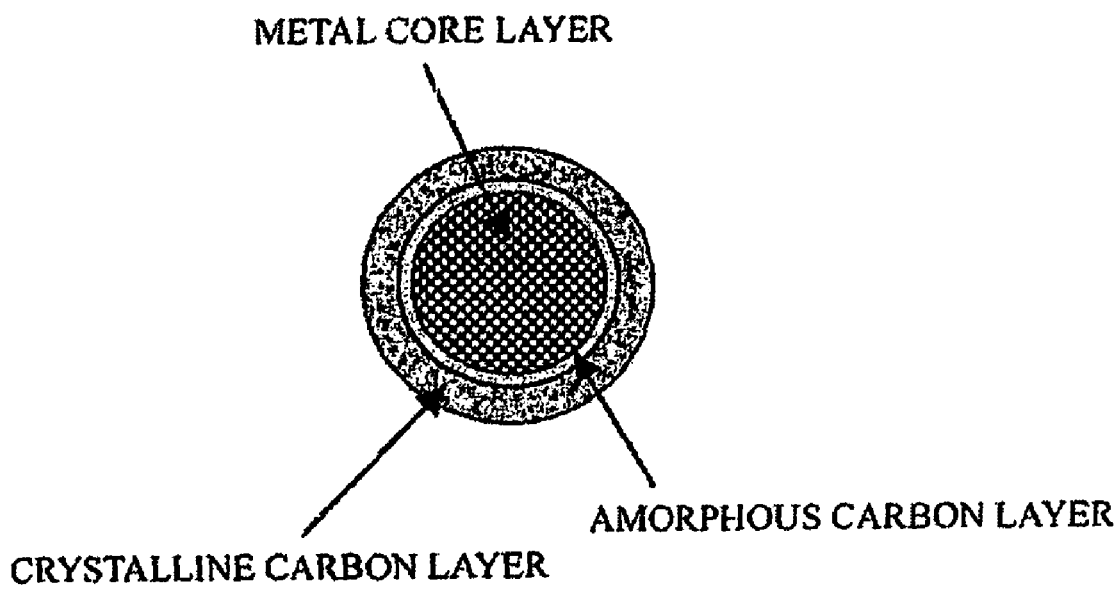
FIG. 1 is a sectional view of an anode material according to a preferred embodiment of the present invention.

FIG. 1 is a sectional view of an anode material according to a preferred embodiment of the present invention. As can be seen from FIG. 1, the surface of a metal capable of electromechanical charge/discharge is coated with a surface layer consisting of an amorphous carbon layer and a crystalline carbon layer.

Metals for forming the metal core layer may include at least one metal selected from the group consisting of Si, Al, Sn, Sb, Bi, As, Ge and Pb or alloys thereof. However, there is no particular limitation in the metals, as long as they are capable of electrochemical and reversible lithium intercalation/deintercalation.

The amorphous carbon may include carbonaceous materials obtained by the heat-treatment of coal tar pitch, petroleum pitch and various organic materials.

The crystalline carbon may include natural graphite, artificial graphite, etc. having a high degree of graphitization, and such graphite-based materials may include MCMB (Meso-Carbon MicroBead), carbon fiber and natural graphite.

Preferably, the ratio of the metal core layer to the amorphous carbon layer to the crystalline carbon layer is 90-10 wt %:0.1-50 wt %:9-90 wt %. If the core layer is present in an amount less than 10 wt %, reversible capacity is low, and thus it is not possible to provide an anode material having a high capacity. If the crystalline carbon layer is present in an amount less than 9 wt %, it is not possible to ensure sufficient conductivity. Further, the amorphous carbon layer is present in an amount less than 0.1 wt %, it is not possible to inhibit the expansion of a metal sufficiently, while it is present in an amount greater than 50 wt %, there is a possibility for the reduction of capacity and conductivity.

The anode material according to the present invention may be prepared as follows. The amorphous carbon layer may be directly coated on the metal forming the core layer by a thin film deposition process such as CVD (chemical vapor deposition), PVD (physical vapor deposition), etc. Otherwise, the metal core layer is coated with various organic material precursors such as petroleum pitch, coal tar pitch, phenolic resins, PVC (polyvinyl chloride), PVA (polyvinyl alcohol), etc., and then the precursors are heat treated under inert atmosphere, at 500-1300° C. for 30 minutes to 3 hours so as to be carbonized, thereby coating the amorphous carbon layer on the metal core layer. Next, to a mixture containing 90-98 wt % of crystalline carbonaceous materials and 2-10 wt % of a binder optionally with 5 wt % or less of a conducting agent, an adequate amount of a solvent is added, and the resultant mixture is homogeneously mixed to form slurry. The slurry is coated on the amorphous carbon layer and then dried to form the crystalline carbonaceous layer.

In a variant, a metal forming the core layer is mixed with crystalline carbon in a predetermined ratio, for example, in the ratio of 10-90 wt %:90-10 wt % of the metal to the crystalline carbon. Then, the amorphous carbon layer and the crystalline carbon layer may be simultaneously formed by using a technique such as a ball mill method, a mechanofusion method and other mechanical alloying methods.

Mechanical alloying methods provide alloys having uniform composition by applying mechanical forces.

Preferably, in the amorphous carbon layer, the interlayer distance (d002) of carbon is 0.34 nm or more and the thickness is 5 nm or more. If the thickness is less than 5 nm, it is not possible to inhibit changes in the volume of the metal core layer sufficiently. If the interlayer distance is less than 0.34 nm, the coating layer itself may undergo an extreme change in volume as the result of repetitive charge/discharge cycles, and thus it is not possible to inhibit changes in the volume of the metal core layer sufficiently, thereby detracting from cycle life characteristics.

Preferably, in the crystalline carbon layer, the interlayer distance (d002) of carbon ranges from 0.3354 nm to 0.35 nm. The lower limit value is the theoretically smallest interlayer distance of graphite and a value less than the lower limit value does not exist. Additionally, carbon having an interlayer distance greater than the upper limit value is poor in conductivity, so that the coating layer has low conductivity, and thus it is not possible to obtain excellent lithium intercalation/deintercalation property.

Further, although there is no particular limitation in the thickness of the crystalline carbon layer, the thickness preferably ranges from 1 micron to 10 microns. If the thickness is less than 1 micron, it is difficult to ensure sufficient conductivity among particles. On the other hand, the thickness is greater than 15 microns, carbonaceous materials occupy a major proportion of the anode material, and thus it is not possible to obtain a high charge/discharge capacity.

The lithium secondary cell according to the present invention utilizes the above-described anode material according to the present invention.

In one embodiment, to prepare an anode by using the anode material according to the present invention, the anode material powder according to the present invention is mixed with a binder and a solvent, and optionally with a conducting agent and a dispersant, and the resultant mixture is agitated to form paste (slurry). Then, the paste is coated on a collector made of a metal, and the coated collector is compressed and dried to provide an anode having a laminated structure.

The binder and the conducting agent are suitably used in an amount of 1-10 wt % and 1-30 wt %, respectively, based on the total weight of the anode material according to the present invention.

Typical examples of the binder include polytetrafluoroethylene (PTFE), polyvinylidene fluoride (PVdF) or copopymers thereof, cellulose, SBR (styrenebutadiene rubber), etc. Further, the solvent may be an organic solvent such as NMP (N-methylpyrrolidone), DMF (dimethylformamide), etc., or water depending on the selection of the binder.

Generally, carbon black may be used as a conducting agent, and commercially available products of carbon black include Acetylene Black series from Chevron Chemical Company or Gulf Oil Company; Ketjen Black EC series from Armak Company; Vulcan XC-72 from Cabot Company; and Super P from MMM Company, or the like.

The collector made of a metal comprises a high-conductivity metal to which the anode material paste is easily adhered. Any metal having no reactivity in the range of drive voltage of the cell may be used. Typical examples for the current collector include copper, gold, nickel, copper alloys, or the combination of them, in the shape of mesh, foil, etc.

In order to coat the paste of anode material to the metal collector, conventional methods or other suitable methods may be used depending on the properties of the used materials. For example, the paste is distributed on the collector and dispersed uniformly with a doctor blade, etc. If desired, the distribution step and the dispersion steps may be performed in one step. In addition to these methods, a die casting method, a comma coating methods and a screen printing method may be selected. Otherwise, the paste is formed on a separate substrate and then pressed or laminated together with the collector.

The coated paste may be dried in a vacuum oven at 50-200° C. for 0.5-3 days, but the drying method is merely illustrative.

Meanwhile, the lithium secondary cell according to the present invention may be prepared with an anode obtained according to the present invention by using a method generally known to one skilled in the art. There is no particular limitation in the preparation method. For example, a separator is inserted between a cathode and an anode, and a non-aqueous electrolyte is introduced. Further, as the cathode, separator, non-aqueous electrolyte, or other additives, if desired, materials known to one skilled in the art may be used, respectively.

Cathode active materials that may be used in the cathode of the lithium secondary cell according to the present invention include lithium-containing transition metal oxides. For example, at least one oxide selected from the group consisting of $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0 \leq Y<1$), $Li(Ni_aCo_bMn_c)O_4$ (wherein $0<a<2$, $0<b<2$, $0<c<2$, $a+b+c=2$), $LiMn_{2-z}Ni_zO_4$, $LiMn_{2-z}CO_zO_4$ (wherein $0<Z<2$), $LiCoPO_4$, and $LiFePO_4$ may be used.

In order to prepare the cell according to the present invention, a porous separator may be used. Particularly, the porous separator may be polyproplene-based, polyethylene-based and polyolefin-based porous separators, but is not limited thereto.

Non-aqueous electrolyte that may be used in the lithium secondary cell according to the present invention may include cyclic carbonates and linear carbonates. Typical examples of cyclic carbonates include ethylene carbonate (EC), propylene carbonate (PC), γ-butyrolactone (GBL) or the like. Typical examples of linear carbonates include diethyl carbonate (DEC), dimethyl carbonate (DMC), ethylmethyl carbonate (EMC), and methylpropyl carbonate (MPC). If desired, electrolyte additives, such as VC(Vinylene Carbonate), PS(1,3-Propane Sultone), ES(Ethylene Sulfite), CHB(Cyclohexyl Benzene), etc., can be used. Further, the non-aqueous electrolyte of the lithium secondary cell according to the present invention further comprises lithium salts in addition to the carbonate compounds. Particular examples of the lithium salts include $LiClO_4$, $LiCF_3SO_3$, $LiPF_6$, $LiBF_4$, $LiAsF_6$, $LiN(CF_3SO_2)_2$, or the like.

A lithium ion secondary cell is a typical example of non-aqueous electrolyte-based secondary cells. Therefore, as long as the anode material according to the present invention is used, the spirit and concept of the present invention may be applied to a non-aqueous electrolyte-based secondary cell that permits reversible intercalation/deintercalation of an alkali metal such as Li, besides a lithium secondary cell. This is also included in the scope of the present invention.

Best Mode for Carrying Out the Invention

Reference will now be made in detail to the preferred embodiments of the present invention. The following examples are illustrative only, and the scope of the present invention is not limited thereto.

EXAMPLE 1

Figure 6:
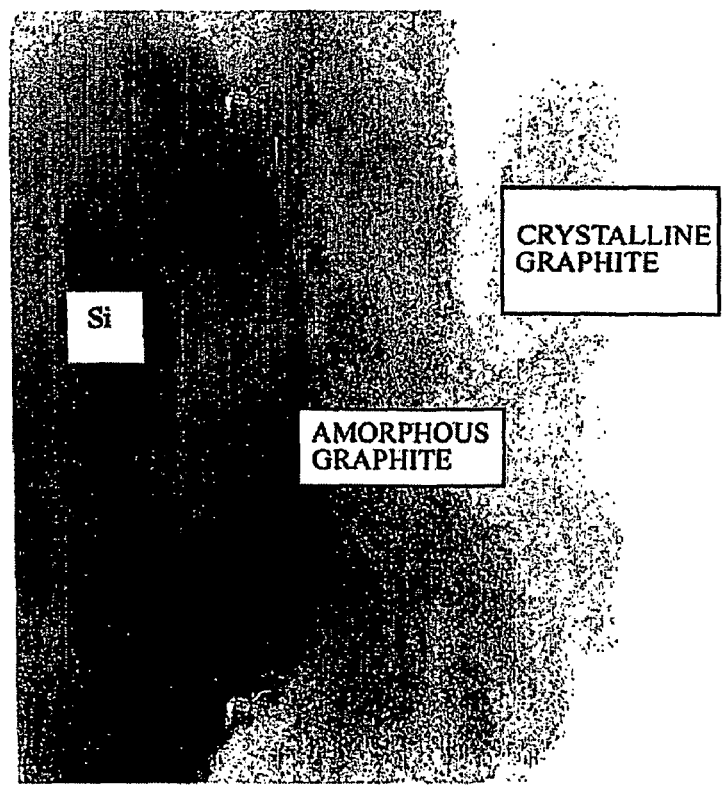
FIG. 6 is a TEM (transmission electron microscope) photo of the anode material obtained from Example 1.

Natural graphite was mixed with Si in a ratio of 50 wt %:50 wt %. Then, mechanical alloying of the mixture was performed by using a Mechano Fusion device available from Hosokawa Micron Company under a rotation speed of 600 rpm for 30 minutes to obtain an anode material. As shown in FIG. 6, the resultant anode material was composed of a Si metal layer, an amorphous carbon layer and a crystalline carbon layer.

In order to evaluate the anode material, the anode material powder was mixed with 10 wt % of PVDF as a binder, 10 wt % of acetylene black as a conducting agent and NMP as a solvent to form homogeneous slurry. The slurry was coated on a copper foil, dried, rolled and then punched into a desired size to obtain an anode. A coin type cell was formed by using the anode, a lithium metal electrode as a counter electrode and an electrolyte containing 1 mole of $LiPF_6$ dissolved in EC and EMC.

EXAMPLE 2

Example 1 was repeated to obtain an anode material and a coin type cell, except that Si was substituted with an alloy having the composition of Si 62 wt %+Co 38% and obtained by a gas atomization method.

COMPARATIVE EXAMPLE 1

Example 1 was repeated to obtain a coin type cell, except using an anode material obtained by carrying out mechanical alloying of Si for 30 minutes by using a mechano fusion device.

COMPARATIVE EXAMPLE 2

Example 1 was repeated to obtain a coin type cell, except that an alloy having the composition of Si 62 wt %+Co 38% and obtained by a gas atomization method was used as an anode material.

COMPARATIVE EXAMPLE 3

Example 1 was repeated to obtain an anode material and a coin type cell, except that Si and graphite were substituted with Si and inherently amorphous hard carbon. The resultant anode material in this case was composed of a Si metal layer and an amorphous carbon layer.

COMPARATIVE EXAMPLE 4

A Si—Co alloy was mixed with graphite micropowder having an average particle diameter of 5 microns or less, and the mixture was treated with a hybridization system for 3 minutes to form an anode material, which was composed of a metal layer and an crystalline carbon layer. Example 1 was repeated to obtain a coin type cell, except that the anode material obtained as described above was used.

Experimental Results

Figure 2:
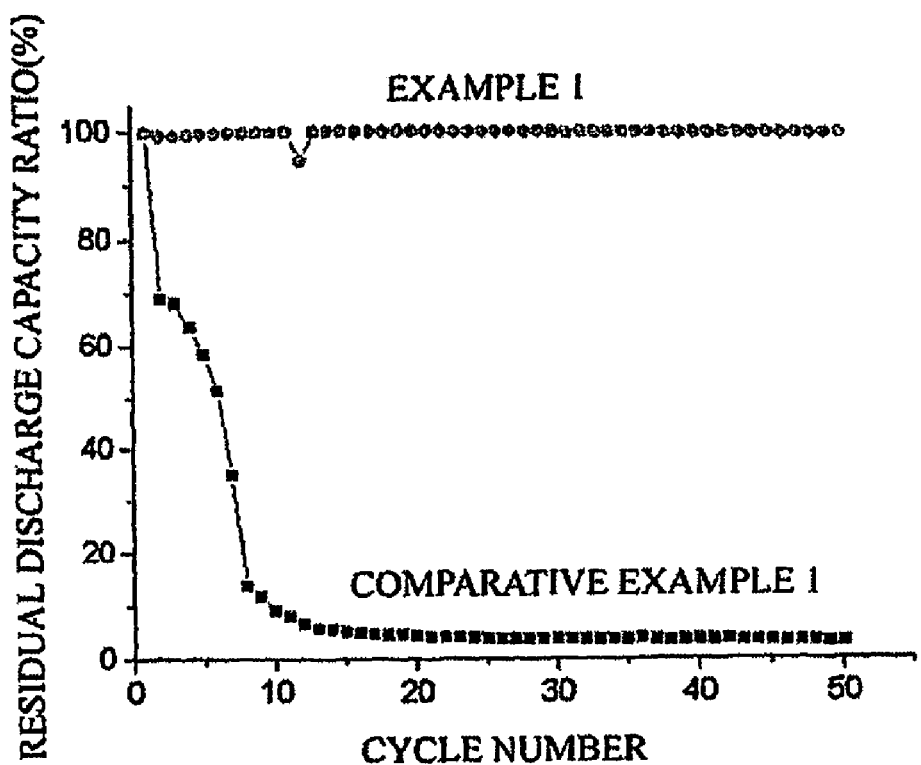
FIG. 2 is a graph showing the cycle life characteristics of the cells obtained from Example 1 and Comparative Example 1.
Figure 3:
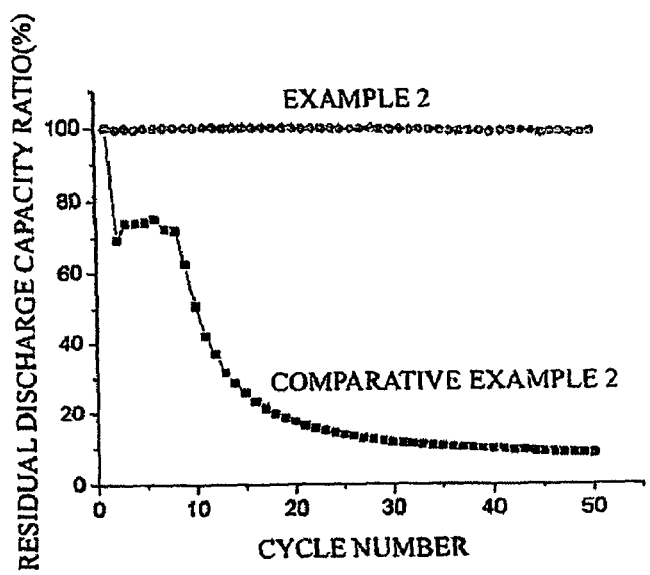
FIG. 3 is a graph showing the cycle life characteristics of the cells obtained from Example 2 and Comparative Example 2.

As shown in FIG. 2, the cell obtained by using an anode material according to Example 1 maintained its initial capacity until 50 cycles. On the other hand, the capacity of the cell obtained by using an anode material according to Comparative Example 1 reduced rapidly in several cycles from the initial point. Such a trend can be seen also from FIG. 3 illustrating the cycle life characteristics of the cells obtained from Example 2 and Comparative Example 2.

Figure 4:
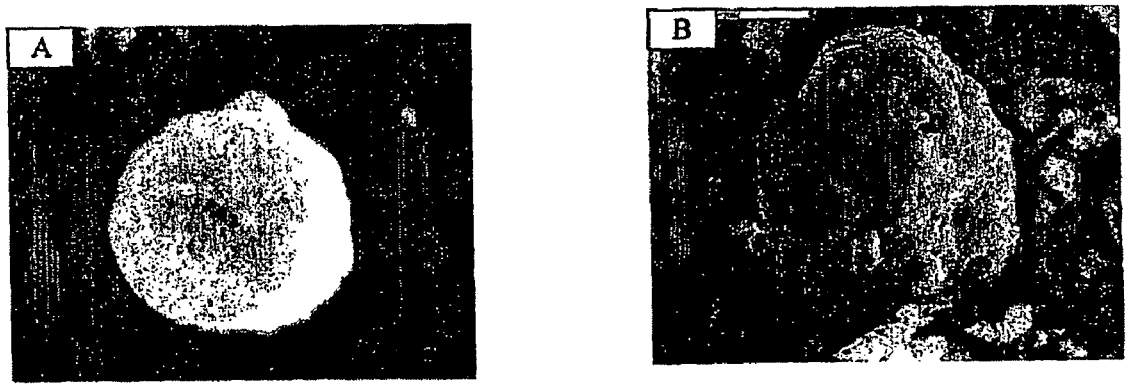
FIG. 4 is an SEM (scanning electron microscope) photo showing the particle surface of the anode material obtained from Example 2, before charge/discharge (A) and after three cycles of charge/discharge (B).
Figure 5:
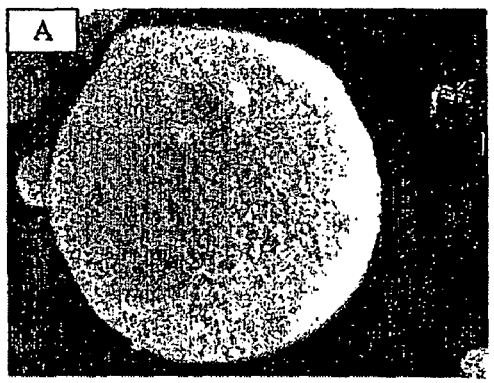
FIG. 5 is an SEM photo showing the particle surface of the anode material obtained from Comparative Example 2, before charge/discharge (A) and after three cycles of charge/discharge (B).
Figure 5:
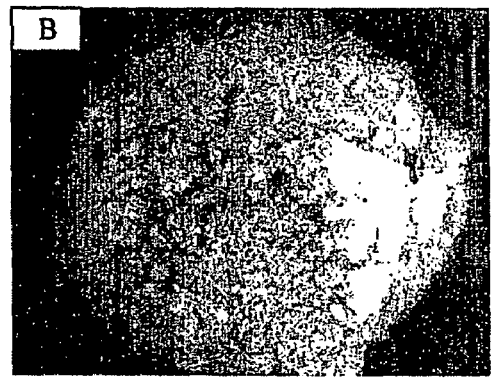

It seems that the anode materials according to Examples 1 and 2 substantially have no changes in their particles, before and after charge/discharge, and thus can provide excellent cycle life characteristics (See, (A) and (B) in FIG. 4). On the other hand, it seems that the anode materials according to Comparative Examples 1 and 2 undergo changes in volume as a result of repetitive charge/discharge, and thus their particles were transformed into porous particles so that their availability was reduced, thereby rapidly detracting from cycle life characteristics (See, (A) and (B) in FIG. 5).

Meanwhile, after completion of 3 cycles of charge/discharge, coin cells were decomposed and thickness of each electrode was measured. In case of using the anode material according to Comparative Example 2, the electrode thickness increased by about 300%, i.e., from 28 μm to 83 μm. On the other hand, in the case of using the anode material according to Example 2, the electrode thickness increased by about 50%, i.e., from 33 μm to 50 μm. Therefore, it can be seen that the anode material according to Example 2 inhibits the volume expansion.

FIG. 6 is a TEM photo of the anode material according to Example 1. By observing the section of the anode material having excellent properties as described above, it can be seen that an amorphous carbon layer is present on the surface of a metal core layer. In FIG. 6, the left side is a part corresponding to Si and the right side is a part corresponding to carbon. As can be seen from FIG. 6, Si retains an excellent crystalline property by the interface between Si and carbon, while carbon loses its inherent crystalline property and provides an amorphous layer in a thickness of about 30 nm.

Further, as can be seen from FIG. 7, excellent cycle life characteristics can be obtained in the case of coexistence of amorphous and crystalline carbon layers. This can be demonstrated by comparing Comparative Example 3 (black line)

including a metal layer coated only with an amorphous carbon layer, Comparative Example 4 (green line) including a metal layer coated only with a crystalline carbon layer, and Example 1 (red line) including a metal layer coated with an amorphous carbon layer and a crystalline carbon layer, successively.

INDUSTRIAL APPLICABILITY

As can be seen from the foregoing, the anode material according to the present invention not only maintains a high charge/discharge capacity, which is an advantage of a metal-based anode material, but also inhibits changes in the volume of a metal core layer caused by repetitive lithium intercalation/deintercalation in virtue of an amorphous carbon layer and a crystalline carbon layer, thereby improving the cycle life characteristics of cells.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An anode material consisting essentially of:
   a metal core layer capable of repetitive lithium intercalation/deintercalation;
   an amorphous carbon layer coated on a totality of a surface of the metal core layer; and
   a crystalline carbon layer coated on a totality of a surface of the amorphous carbon layer;
   wherein the metal core layer consists of at least one metal selected from the group consisting of Si, Al, Sn, Sb, Bi, As, Ge and Pb.

2. The anode material according to claim 1, wherein the ratio of the metal core layer to the amorphous carbon layer to the crystalline carbon layer is 90-10wt % :0.1-50 wt % :9-90 wt %.

3. The anode material according to claim 1, wherein the amorphous carbon layer has an interlayer distance (d002) of carbon atom of 0.34 nm or more, and a thickness of 5 nm or more.

4. The anode material according to claim 1, wherein the crystalline carbon layer has an interlayer distance (d002) of carbon atom ranged from 0.3354 nm to 0.35 nm, and a thickness ranged from 1 micron to 10 microns.

5. A secondary cell using an anode material, the anode material consisting essentially of:
   a metal core layer capable of repetitive lithium intercalation/deintercalation;
   an amorphous carbon layer coated on a totality of a surface of the metal core layer; and
   a crystalline carbon layer coated on a totality of a surface of the amorphous carbon layer;
   wherein the metal core layer consists of at least one metal selected from the group consisting of Si, Al, Sn, Sb, Bi, As, Ge and Pb.

6. The secondary cell according to claim 5, wherein the ratio of the metal core layer to the amorphous carbon layer to the crystalline carbon layer is 90-10 wt %:0.1-50 wt %:9-90 wt %.

7. The secondary cell according to claim 5, wherein the amorphous carbon layer has an interlayer distance (d002) of carbon atom of 0.34 nm or more, and a thickness of 5 nm or more.

8. The secondary cell according to claim 7, wherein the crystalline carbon layer has an interlayer distance (d002) of carbon atom ranged from 0.3354 nm to 0.35 nm, and a thickness ranged from 1 micron to 10 microns.

9. A method for preparing an anode material, the method comprising:
   coating an amorphous carbon layer on a metal core layer by a thin film deposition process, or coating pitch or organic material precursors on a metal core layer and heat treating to perform carbonization, thereby coating an amorphous carbon layer on the metal core layer; and
   coating slurry containing crystalline carbonaceous materials on the surface of the amorphous carbon layer and drying to form a crystalline carbon layer,
   wherein the anode material consists essentially of:
   a metal core layer capable of repetitive lithium intercalation/deintercalation;
   an amorphous carbon layer coated on a totality of a surface of the metal core layer; and
   a crystalline carbon layer coated on a totality of a surface of the amorphous carbon layer; wherein the metal core layer consists of at least one metal selected from the group consisting of Si, Al, Sn, Sb, Bi, As, Ge and Pb.

10. A method for preparing an anode material, the method comprising:
    mixing a metal forming a core layer with crystalline carbon; and
    carrying out a mechanical alloying process to form an amorphous carbon layer and a crystalline carbon layer simultaneously on the metal core layer,
    wherein the anode material consists essentially of:
    a metal core layer capable of repetitive lithium intercalation/deintercalation;
    an amorphous carbon layer coated on a totality of a surface of the metal core layer; and
    a crystalline carbon layer coated on a totality of a surface of the amorphous carbon layer;
    wherein the metal core layer consists of at least one metal selected from the group consisting of Si, Al, Sn, Sb, Bi, As, Ge and Pb.

11. The method according to claim 10, wherein the mixing ratio of the metal to the crystalline carbon is 10-90:90-10.

* * * * *